123,466

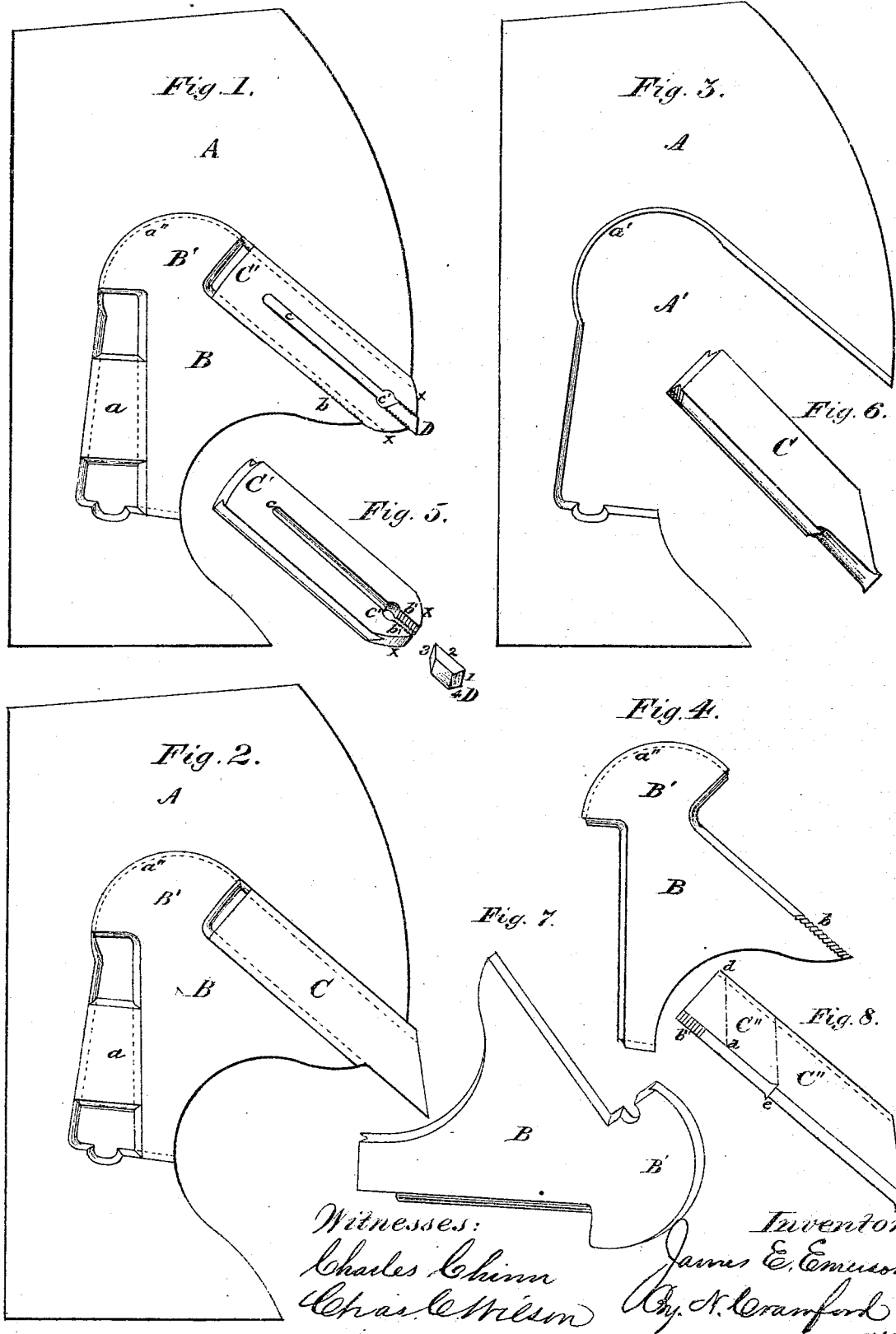

UNITED STATES PATENT OFFICE.

JAMES E. EMERSON, OF TRENTON, NEW JERSEY.

IMPROVEMENT IN SAWS.

Specification forming part of Letters Patent No. 123,466, dated February 6, 1872.

I, JAMES E. EMERSON, of Trenton, in the county of Mercer, in the State of New Jersey, have made certain Improvements in Saws, of which the following is a specification:

The object of this invention is to improve circular or other saws having insertable teeth, by the use of such devices that the teeth or cutter holders are securely held in the saw-blade in such manner as to avoid the springing or stretching the outer edge of the saw-plate, and the teeth or holders more securely held in position. And it consists in the construction of the mouth-piece or clamp by which the tooth or cutter holder is held in its place in the saw-plate, and is free to be removed from, replaced, or adjusted in the saw-plate when desired. It further consists in corrugating, notching, or cutting a file-surface on the edge of such clamp or tooth where they come in contact. And it also consists in the construction of a spring-slotted cutter-holder and in the cutter to be placed in and held by said holder, as is more fully described and claimed hereafter.

In the drawing, Figure 1 represents a section of a saw-plate having the clamp or mouth-piece, cutter-holder, and cutter in place; Fig. 2, a section of a saw-plate with the mouth-piece or clamp and solid or whole tooth in place; Fig. 3, a section of a saw-plate with the mouth-piece or clamp and tooth or cutter-holder removed; Fig. 4, a side view of the mouth-piece or clamp; Fig. 5, a side view of the slotted cutter-holder with the cutter removed; and Fig. 6 is a side view of the solid or whole tooth. Fig. 7 is a side view of the mouth-piece or clamp, having the side next the tooth smooth, or either ribbed or grooved; and Fig. 8 is a side view of a solid tooth, hardened at its back end, having a plane surface on its edge to join on the mouth-piece or clamp, and corrugated or file-cut on the edge at its back end, on the side next the mouth-piece or clamp.

A is a section of the saw-plate, having the opening A' that receives the clamp or mouth-piece, tooth, and wedge. B is the mouth-piece or clamp, made in the form seen in Fig. 4, with the part that abuts against the saw-plate in form of a segment of a circle of the diameter desired, the edge grooved in V-form at $a''$, and fitting on a V-shaped rib, $a'$, on the concave part of the recess or opening in the saw-plate, and has the rib on the side next the tooth or cutter holder, the whole or part of its length, corrugated, notched, or having a file-surface cut or made thereon, as seen at $b$, Fig. 4. The surface so corrugated, notched, or file-cut is then case-hardened, and when brought in hard contact with the grooved surfaces of the tooth or cutter holder will firmly hold the tooth or cutter holder from being thrown out of its place by centrifugal force, or from being driven in by striking any hard substance, such as knots in many kinds of wood; or the edge of the mouth-piece or clamp that comes in contact with the tooth may be flat and straight without being either file-cut, corrugated, or case-hardened, as described and seen in Fig. 7.

This construction of mouth-piece or clamp B is an improvement on that patented to me April 25, 1871, which is similar in its general form, but very dissimilar in the way of applying it to the saw-plate, as the clamp in that patent is riveted or headed on each side of the saw enough to keep it in the plate, but not upset enough to prevent its turning on its pivot to clamp the tooth in its place; while in this invention the pivoted part B' of the clamp is not riveted or headed onto the saw-plate, but is only grooved to fit onto a rib in the saw-plate, while its forward end abuts against a slightly-inclined part of the recess in the saw-plate, which allows the clamp or mouth-piece to be forced up hard against the tooth or cutter holder by the wedge $a$ that slides between it and the saw-plate; and no danger is or can be had in this construction of clamp of springing or enlarging the outer edge of the saw-plate by riveting of the pivotal part B', as in the patent above quoted—as in that construction there is danger of springing the plate when the saw is in the hands of inexperienced operators—as the whole strain or the liability of straining the outer edge of the saw-plate is removed or avoided by having the clamp or mouth-piece fitted to move without any riveting or heading the pivotal part and have it removable.

C is a solid or whole tooth, made, as usual, with its edges grooved so as to fit on the ribs of the clamp or mouth-piece on one side and the saw-plate on the other, its sides parallel, so that it can be adjusted to project more or less from the edge of the saw-plate. Tooth C″ is preferably made to have the edge that comes in contact with and bears upon the mouth-piece or clamp straight and plane, with a file-cut surface at b″ hardened at its back end to the oblique dotted line d d, as seen in Fig. 8, by which construction the hard file-surface or teeth will, when the mouth-piece is clamped hard upon the tooth, take hold of or be pressed into the metal of the edge of the mouth-piece, and be securely held in its position, and by which the teeth can be held and worn up to a shorter stub than has heretofore been done, as a tooth can be worn up to be no longer than is shown in Fig. 8, where the cutting-point of the tooth is represented as being worn up to e in dotted lines on tooth C″. The tooth C″ differs from tooth C only in having one of its edges plane or smooth, and file-cut surface b″ cut thereon, and without throat-way. The teeth—whether grooved or ribbed longitudinally, or plane-jointed and file-cut at their back ends, and hardened like a file up to line d d, and bearing against the softer metal of the mouth-piece or saw-plate—will be held securely in place, and can be worn up to be shorter than by any method known by me of holding teeth in saw-plates. C′ is a slotted spring cutter-holder, its sides, made to be parallel, of the same width, and to be interchanged, when desired, with the teeth C. It has a long longitudinal slot, c, centrally of its width, with a round hole, c′, terminating it, and of a larger diameter than the width of the slot. From this hole c′ to the outer end of the holder are holding-jaws x x, or the part that receives and holds the removable cutter, which, like the clamp or mouth-piece, is corrugated, notched, or file-cut on their inner edges at b′, as seen in Fig. 5; and when the holder is complete the jaws, when they are notched or file-cut, will be case-hardened, and the whole holder have a spring temper, so that the two jaws x x can be sprung apart or forced together; or the slot may be contracted in width to be narrower at hole c′ than at its terminal point, so that force may be applied to open the jaws to receive the cutter. D is a removable and adjustable cutter, with two or more cutting-edges thereon, and is made to have all its edges equal in extent or length, or in the form of a parallelogram, and all its four sides made with cutting-edges, and so that it may be adjusted to cut a groove or kerf the width of the length of the cutter, or only as wide as the width of the cutter, or every alternate cutter may be set out further to one side of the plate, while the next will be set as far in the opposite direction, or to the other side of the saw-plate, thus cutting a kerf wider than the width of a single cutter; or the saw may be constructed with the solid teeth C or C″ alternating with the cutter-holders C′ and cutter D, so that the tooth C or C″ will cut the kerf and the cutters D plane or smooth the sides of the kerf.

The mouth-piece or clamp is forced hard against the edge of the tooth or cutter holder by pushing the wedge a forward, and the tooth or cutter holder is released by pushing the wedge back, when the clamp can be, by a slight blow on its upper forward end, driven down onto the wedge, and the tooth or cutter holder can be removed or another put in its place, when by forcing the wedge a forward again the clamp will be forced against the tooth or cutter holder and be firmly held in place.

Teeth, in a saw-plate, that are removable can thus be quickly put in or removed from said saw-plate, as it only requires the moving the wedge and depressing the clamp-piece to loosen the tooth or holder, and when another tooth or holder is inserted the wedge is as quickly forced back to clamp the mouth-piece upon the tooth or holder.

The operation is simple, easily effected, and the device is safe, durable, and not subject to get out of place; and a saw constructed from the parts and arranged together as described will always be in order for work, keep its shape, and will not spring out of true.

Having thus described my invention, what I claim, and desire to secure by Letters Patent, is—

1. The removable mouth-piece or clamp B, having pivotal part B′, to fit in the recess of a saw-blade and vibrate therein, when constructed to operate in the manner and for the purpose described.

2. The removable mouth-piece or clamp B, having pivotal part B′ and file-cut surface b, in combination with the slotted-spring cutter-holder C′ and saw-blade A, substantially as described and seen in Fig. 1.

3. The removable mouth-piece or clamp B, having pivotal part B′, in combination with the tooth C, having a file-cut surface, as seen in Fig. 6, and saw-blade A, substantially as seen in Fig. 2.

4. The removable mouth-piece or clamp B, having pivotal part B′, Fig. 7, in combination with the tooth C″, having a plane edge with a file-cut surface, b′, thereon, hardened at its back end at d d, Fig. 8, and the saw-blade A, substantially as described.

5. The slotted-spring cutter-holder C′, constructed in the manner and for the purpose described.

6. The cutter D, constructed as described, in combination with the spring-slotted cutter-holder C′ and mouth-piece or clamp B, having pivotal part B′, constructed and arranged in the manner and for the purpose described and seen in Fig. 1.

J. E. EMERSON.

Witnesses:
NEWTON CRAWFORD,
CHARLES CHINN.